(12) United States Patent
Huber

(10) Patent No.: US 9,776,903 B2
(45) Date of Patent: Oct. 3, 2017

(54) APPARATUS, SYSTEMS AND METHODS FOR PROCESSING MOLTEN GLASS

(71) Applicant: JOHNS MANVILLE, Denver, CO (US)

(72) Inventor: Aaron Morgan Huber, Castle Rock, CO (US)

(73) Assignee: Johns Manville, Denver, CO (US)

(*) Notice: Subject to any disclaimer, the term of this patent is extended or adjusted under 35 U.S.C. 154(b) by 66 days.

(21) Appl. No.: 14/533,206

(22) Filed: Nov. 5, 2014

(65) Prior Publication Data

US 2016/0122221 A1    May 5, 2016

(51) Int. Cl.
| | |
|---|---|
| C03B 5/225 | (2006.01) |
| C03B 5/23 | (2006.01) |
| C03B 5/44 | (2006.01) |
| C03C 1/00 | (2006.01) |
| C03B 5/167 | (2006.01) |
| C03B 5/20 | (2006.01) |
| C03B 5/235 | (2006.01) |
| C03B 5/43 | (2006.01) |
| C03C 3/087 | (2006.01) |

(52) U.S. Cl.
CPC ............ *C03B 5/225* (2013.01); *C03B 5/1675* (2013.01); *C03B 5/20* (2013.01); *C03B 5/202* (2013.01); *C03B 5/23* (2013.01); *C03B 5/2356* (2013.01); *C03B 5/43* (2013.01); *C03B 5/44* (2013.01); *C03C 1/002* (2013.01); *C03C 3/087* (2013.01)

(58) Field of Classification Search
CPC ......... C03B 5/182; C03B 5/20; C03B 5/2257; C03B 5/2252; C03B 5/225
See application file for complete search history.

(56) References Cited

U.S. PATENT DOCUMENTS

| 1,716,433 A | 6/1929 | Ellis |
| 1,989,103 A | 1/1935 | McKelvey et al. |

(Continued)

FOREIGN PATENT DOCUMENTS

| DE | 36 29 965 A1 | 3/1988 |
| DE | 44 24 814 A1 | 1/1996 |

(Continued)

OTHER PUBLICATIONS

"AccuTru Temperature Measurement," AccuTru International Corporation, 2003.

(Continued)

*Primary Examiner* — Jason L Lazorcik
(74) *Attorney, Agent, or Firm* — Robert D. Touslee

(57) ABSTRACT

Apparatus, systems and methods for refining molten glass include a fining chamber having a refractory floor and a sidewall structure that may include a refractory liner, and includes an inlet transition region having increasing width from initial to a final width, and depth decreasing from an initial to final depth. The floor includes a raised curb having width equal to final width of the inlet transition region, curb length less than the length of the inlet transition region, and curb height forming a shallowest depth portion of the fining chamber. The raised curb separates the fining chamber into the inlet transition region and a primary fining region, the primary fining region defined by the refractory floor and sidewall structure. The primary fining region has a constant depth greater than the shallowest depth but less than the depth of the inlet transition region.

33 Claims, 5 Drawing Sheets

(56) References Cited

U.S. PATENT DOCUMENTS

| | | | |
|---|---|---|---|
| 2,119,948 A * | 6/1938 | Blau | C03B 5/182 |
| | | | 432/249 |
| 2,174,533 A | 10/1939 | See et al. | |
| 2,118,479 A | 1/1940 | McCaskey | |
| 2,269,459 A | 1/1942 | Kleist | |
| 2,432,942 A | 12/1947 | See et al. | |
| 2,455,907 A | 1/1948 | Slayter | |
| 2,679,749 A | 6/1954 | Poole | |
| 2,718,096 A | 9/1955 | Henry et al. | |
| 2,773,545 A | 12/1956 | Petersen | |
| 2,781,756 A | 2/1957 | Kobe | |
| 2,878,644 A | 3/1959 | Fenn | |
| 2,890,166 A | 6/1959 | Heinze | |
| 2,902,029 A | 9/1959 | Hill | |
| 2,981,250 A | 4/1961 | Stewart | |
| 3,020,165 A | 2/1962 | Davis | |
| 3,056,283 A | 10/1962 | Tiede | |
| 3,073,683 A | 1/1963 | Switzer et al. | |
| 3,084,392 A | 4/1963 | Labino | |
| 3,088,812 A | 5/1963 | Bitterlich et al. | |
| 3,104,947 A | 9/1963 | Switzer et al. | |
| 3,160,578 A | 12/1964 | Saxton et al. | |
| 3,165,452 A | 1/1965 | Williams | |
| 3,170,781 A | 2/1965 | Keefer | |
| 3,174,820 A | 3/1965 | See et al. | |
| 3,215,189 A | 11/1965 | Bauer | |
| 3,224,855 A | 12/1965 | Plumat | |
| 3,237,929 A | 3/1966 | Plumat et al. | |
| 3,241,548 A | 3/1966 | See et al. | |
| 3,245,769 A | 4/1966 | Eck et al. | |
| 3,248,205 A | 4/1966 | Dolf et al. | |
| 3,260,587 A | 7/1966 | Dolf et al. | |
| 3,268,313 A | 8/1966 | Burgman et al. | |
| 3,285,834 A | 11/1966 | Guerrieri et al. | |
| 3,294,512 A | 12/1966 | Penberthy | |
| 3,325,298 A | 6/1967 | Brown | |
| 3,385,686 A | 5/1968 | Plumat et al. | |
| 3,402,025 A | 9/1968 | Garrett et al. | |
| 3,407,805 A | 10/1968 | Bougard | |
| 3,407,862 A | 10/1968 | Mustian, Jr. | |
| 3,421,873 A | 1/1969 | Burgman et al. | |
| 3,432,399 A | 3/1969 | Schutt | |
| 3,445,214 A | 5/1969 | Oremesher | |
| 3,498,779 A | 3/1970 | Hathaway | |
| 3,510,393 A | 5/1970 | Burgman et al. | |
| 3,519,412 A | 7/1970 | Olink | |
| 3,525,674 A | 8/1970 | Barnebey | |
| 3,533,770 A | 10/1970 | Adler et al. | |
| 3,563,683 A | 2/1971 | Hess | |
| 3,592,151 A | 7/1971 | Webber | |
| 3,592,623 A | 7/1971 | Shepherd | |
| 3,606,825 A | 9/1971 | Johnson | |
| 3,617,234 A | 11/1971 | Hawkins et al. | |
| 3,627,504 A | 12/1971 | Johnson et al. | |
| 3,692,017 A | 9/1972 | Glachant et al. | |
| 3,717,139 A | 2/1973 | Guillet et al. | |
| 3,738,792 A | 6/1973 | Feng | |
| 3,741,742 A | 6/1973 | Jennings | |
| 3,746,527 A | 7/1973 | Knavish et al. | |
| 3,747,588 A | 7/1973 | Booth | |
| 3,754,879 A | 8/1973 | Phaneuf | |
| 3,756,800 A | 9/1973 | Phaneuf | |
| 3,763,915 A | 10/1973 | Perry et al. | |
| 3,764,287 A | 10/1973 | Brocious | |
| 3,771,988 A | 11/1973 | Starr | |
| 3,818,893 A | 6/1974 | Kataoka et al. | |
| 3,835,909 A | 9/1974 | Douglas et al. | |
| 3,840,002 A | 10/1974 | Douglas et al. | |
| 3,856,496 A | 12/1974 | Nesbitt et al. | |
| 3,885,945 A | 5/1975 | Rees et al. | |
| 3,907,585 A | 9/1975 | Francel et al. | |
| 3,913,560 A | 10/1975 | Lazarre et al. | |
| 3,951,635 A | 4/1976 | Rough | |
| 3,976,464 A | 8/1976 | Wardlaw | |
| 4,001,001 A | 1/1977 | Knavish et al. | |
| 4,004,903 A | 1/1977 | Daman et al. | |
| 4,083,711 A | 4/1978 | Jensen | |
| 4,110,098 A | 8/1978 | Mattmuller | |
| 4,153,438 A | 5/1979 | Stream | |
| 4,185,982 A | 1/1980 | Schwenninger | |
| 4,203,761 A | 5/1980 | Rose | |
| 4,205,966 A | 6/1980 | Horikawa | |
| 4,226,564 A | 10/1980 | Takahashi et al. | |
| 4,238,226 A | 12/1980 | Sanzenbacher et al. | |
| 4,249,927 A | 2/1981 | Fakuzaki et al. | |
| 4,270,740 A | 6/1981 | Sanzenbacher et al. | |
| 4,282,023 A | 8/1981 | Hammel et al. | |
| 4,303,435 A | 12/1981 | Sleighter | |
| 4,309,204 A | 1/1982 | Brooks | |
| 4,323,718 A | 4/1982 | Buhring et al. | |
| 4,349,376 A | 9/1982 | Dunn et al. | |
| 4,360,373 A | 11/1982 | Pecoraro | |
| 4,397,692 A | 8/1983 | Ramge et al. | |
| 4,406,683 A | 9/1983 | Demarest | |
| 4,413,882 A | 11/1983 | Bailey et al. | |
| 4,424,071 A * | 1/1984 | Steitz | C03B 5/03 |
| | | | 65/135.7 |
| 4,432,780 A | 2/1984 | Propster et al. | |
| 4,488,537 A | 12/1984 | Laurent | |
| 4,539,034 A | 9/1985 | Hanneken | |
| 4,542,106 A | 9/1985 | Sproull | |
| 4,545,800 A | 10/1985 | Won et al. | |
| 4,626,199 A | 12/1986 | Bounini | |
| 4,632,687 A | 12/1986 | Kunkle et al. | |
| 4,634,461 A | 1/1987 | Demarest, Jr. et al. | |
| 4,657,586 A | 4/1987 | Masterson et al. | |
| 4,693,740 A * | 9/1987 | Noiret | C03B 5/027 |
| | | | 65/135.1 |
| 4,723,708 A | 2/1988 | Berger et al. | |
| 4,735,642 A | 4/1988 | Jensen et al. | |
| 4,738,938 A | 4/1988 | Kunkle et al. | |
| 4,758,259 A | 7/1988 | Jensen | |
| 4,798,616 A | 1/1989 | Knavish et al. | |
| 4,814,387 A | 3/1989 | Donat | |
| 4,816,056 A | 3/1989 | Tsai et al. | |
| 4,877,436 A | 10/1989 | Sheinkop | |
| 4,877,449 A | 10/1989 | Khinkis | |
| 4,882,736 A * | 11/1989 | Pieper | C03B 3/02 |
| | | | 373/32 |
| 4,886,539 A | 12/1989 | Gerutti et al. | |
| 4,919,700 A | 4/1990 | Pecoraro et al. | |
| 4,927,886 A | 5/1990 | Backderf et al. | |
| 4,929,266 A * | 5/1990 | Cozac | C03B 5/03 |
| | | | 65/134.5 |
| 4,953,376 A | 9/1990 | Merlone | |
| 5,011,086 A | 4/1991 | Sonnleitner | |
| 5,032,230 A | 7/1991 | Shepherd | |
| 5,052,874 A | 10/1991 | Johanson | |
| 5,062,789 A | 11/1991 | Gitman | |
| 5,097,802 A | 3/1992 | Clawson | |
| 5,168,109 A | 12/1992 | Backderf et al. | |
| 5,169,424 A | 12/1992 | Grinnen et al. | |
| 5,194,081 A * | 3/1993 | Trevelyan | C03B 3/02 |
| | | | 65/135.1 |
| 5,199,866 A | 4/1993 | Joshi et al. | |
| 5,204,082 A | 4/1993 | Schendel | |
| 5,299,929 A | 4/1994 | Yap | |
| 5,360,171 A | 11/1994 | Yap | |
| 5,370,723 A * | 12/1994 | Trevelyan | C03B 3/02 |
| | | | 65/346 |
| 5,374,595 A | 12/1994 | Dumbaugh et al. | |
| 5,405,082 A | 4/1995 | Brown et al. | |
| 5,449,286 A | 9/1995 | Snyder et al. | |
| 5,473,885 A | 12/1995 | Hunter, Jr. et al. | |
| 5,483,548 A | 1/1996 | Coble | |
| 5,490,775 A | 2/1996 | Joshi et al. | |
| 5,522,721 A | 6/1996 | Drogue et al. | |
| 5,545,031 A | 8/1996 | Joshi et al. | |
| 5,575,637 A | 11/1996 | Slavejkov et al. | |
| 5,595,703 A | 1/1997 | Swaelens et al. | |
| 5,606,965 A | 3/1997 | Panz et al. | |
| 5,613,994 A | 3/1997 | Muniz et al. | |
| 5,615,668 A | 4/1997 | Panz et al. | |
| 5,636,623 A | 6/1997 | Panz et al. | |

| Patent No. | Date | Inventor |
|---|---|---|
| 5,672,827 A | 9/1997 | Jursich |
| 5,713,668 A | 2/1998 | Lunghofer et al. |
| 5,718,741 A | 2/1998 | Hull et al. |
| 5,736,476 A | 4/1998 | Warzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,944,864 A | 8/1999 | Hull et al. |
| 5,954,498 A | 9/1999 | Joshi et al. |
| 5,975,886 A | 11/1999 | Philippe |
| 5,979,191 A | 11/1999 | Jian |
| 5,984,667 A | 11/1999 | Phillippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,045,353 A | 4/2000 | VonDrasek et al. |
| 6,068,468 A | 5/2000 | Phillippe et al. |
| 6,071,116 A | 6/2000 | Philippe et al. |
| 6,074,197 A | 6/2000 | Philippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,119,484 A * | 9/2000 | Takei .................... C03B 5/1672 65/134.2 |
| 6,120,889 A | 9/2000 | Turner et al. |
| 6,123,542 A | 9/2000 | Joshi et al. |
| 6,126,438 A | 10/2000 | Joshi et al. |
| 6,154,481 A * | 11/2000 | Sorg .......................... C03B 5/04 373/30 |
| 6,156,285 A | 12/2000 | Adams et al. |
| 6,171,100 B1 | 1/2001 | Joshi et al. |
| 6,178,777 B1 | 1/2001 | Chenoweth |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Philippe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,308,534 B1 * | 10/2001 | Takei .................... C03B 5/2252 65/134.2 |
| 6,314,760 B1 | 11/2001 | Chenoweth |
| 6,314,896 B1 | 11/2001 | Marin et al. |
| 6,332,339 B1 | 12/2001 | Kawaguchi et al. |
| 6,338,337 B1 | 1/2002 | Panz et al. |
| 6,339,610 B1 * | 1/2002 | Hoyer ....................... C03B 5/03 373/27 |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,405,564 B1 * | 6/2002 | Takei .................... C03B 5/1675 65/134.2 |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,238 B2 | 3/2003 | Kawaguchi et al. |
| 6,536,651 B2 | 3/2003 | Ezumi et al. |
| 6,558,606 B1 | 5/2003 | Kulkarni et al. |
| 6,578,779 B2 | 6/2003 | Dion |
| 6,660,106 B1 | 12/2003 | Babel et al. |
| 6,694,791 B1 | 2/2004 | Johnson et al. |
| 6,701,617 B2 | 3/2004 | Li et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Smith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,231,788 B2 | 6/2007 | Karetta et al. |
| 7,273,583 B2 | 9/2007 | Rue et al. |
| 7,330,634 B2 | 2/2008 | Aitken et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 8,033,254 B2 | 10/2011 | Hannum et al. |
| 8,279,899 B2 | 10/2012 | Kitabayashi |
| 8,285,411 B2 | 10/2012 | Hull et al. |
| 2002/0086077 A1 | 7/2002 | Noller et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2003/0066315 A1 * | 4/2003 | Sakai ...................... C03B 5/205 65/157 |
| 2004/0099009 A1 * | 5/2004 | Linz ...................... C03B 5/1672 65/135.1 |
| 2004/0131988 A1 | 7/2004 | Baker et al. |
| 2004/0168474 A1 | 9/2004 | Jeanvoine et al. |
| 2004/0182113 A1 * | 9/2004 | Tomamoto ............... C03B 5/182 65/135.1 |
| 2004/0224833 A1 | 11/2004 | Jeanvoine et al. |
| 2005/0039491 A1 | 2/2005 | Maugendre et al. |
| 2005/0103323 A1 | 5/2005 | Engdahl |
| 2005/0236747 A1 | 10/2005 | Rue et al. |
| 2006/0000239 A1 | 1/2006 | Jeanvoine et al. |
| 2006/0162387 A1 | 7/2006 | Schmitt et al. |
| 2006/0174655 A1 | 8/2006 | Kobayashi et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0212546 A1 | 9/2007 | Jeanvoine et al. |
| 2007/0220922 A1 | 9/2007 | Bauer et al. |
| 2007/0278404 A1 | 12/2007 | Spanke et al. |
| 2008/0035078 A1 | 2/2008 | Li |
| 2008/0120997 A1 * | 5/2008 | Takeshita ........... B01D 19/0031 65/134.2 |
| 2008/0227615 A1 | 9/2008 | McGinnis et al. |

| | | |
|---|---|---|
| 2008/0256981 A1 | 10/2008 | Jacques et al. |
| 2008/0276652 A1 | 11/2008 | Bauer et al. |
| 2008/0293857 A1 | 11/2008 | Crawford et al. |
| 2009/0042709 A1 | 2/2009 | Jeanvoine et al. |
| 2009/0220899 A1 | 9/2009 | Spangelo et al. |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0143601 A1 | 6/2010 | Hawtof et al. |
| 2010/0227971 A1 | 9/2010 | Crawford et al. |
| 2010/0236323 A1 | 9/2010 | D'Angelico et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0326137 A1 | 12/2010 | Rouchy et al. |
| 2011/0016922 A1* | 1/2011 | Kitamura ............ C03B 5/2252 65/134.2 |
| 2011/0034316 A1* | 2/2011 | Leister .................. C03B 5/04 501/94 |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1* | 9/2011 | Rue ..................... F27B 3/205 432/195 |
| 2011/0308280 A1 | 12/2011 | Huber |
| 2012/0077135 A1 | 3/2012 | Charbonneau |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |
| 2013/0086952 A1 | 4/2013 | Charbonneau et al. |

FOREIGN PATENT DOCUMENTS

| | | |
|---|---|---|
| DE | 196 19 919 A1 | 8/1997 |
| DE | 100 29 983 A1 | 1/2002 |
| DE | 100 29 983 C2 | 9/2003 |
| DE | 10 2005 033330 B3 | 8/2006 |
| EP | 0 181 248 B1 | 10/1989 |
| EP | 1 337 789 B1 | 12/2004 |
| EP | 1 990 321 A1 | 11/2008 |
| EP | 2 133 315 A1 | 12/2009 |
| EP | 1 986 966 B1 | 4/2010 |
| EP | 1 667 934 B1 | 2/2011 |
| EP | 2 397 446 A2 | 12/2011 |
| EP | 2 433 911 A1 | 3/2012 |
| EP | 2 578 548 A2 | 4/2013 |
| FR | 2 740 860 A1 | 9/1997 |
| GB | 191301772 | 0/1914 |
| GB | 191407633 | 0/1914 |
| GB | 164073 | 5/1921 |
| GB | 250 536 A | 7/1926 |
| GB | 1449439 | 9/1976 |
| IT | 1208172 | 7/1989 |
| JP | S58 199728 A | 11/1983 |
| JP | H08 290918 A | 11/1996 |
| KR | 2000 0050572 A | 8/2000 |
| RO | 114827 | 7/1999 |
| WO | 9855411 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2013 162986 A1 | 10/2013 |
| WO | 2013 188082 A1 | 12/2013 |

OTHER PUBLICATIONS

Muijsenberg, H. P. H., Neff, G., Muller, J., Chmelar, J., Bodi, R. and Matustikj, F. (2008) "An Advanced Control System to Increase Glass Quality and Glass Production Yields Based on GS ESLLI Technology", in a Collection of Papers Presented at the 66th Conference on Glass Problems: Ceramic Engineering and Science Proceedings, vol. 27, Issue 1 (ed W. M. Kriven), John Wiley & Sons, Inc., Hoboken, NJ, USA. doi: 10.1002/9780470291306.ch3.

Muijsenberg, E., Eisenga, M. and Buchmayer, J. (2010) "Increase of Glass Production Efficiency and Energy Efficiency with Model-Based Predictive Control", in 70th Conference on Glass Problems: Ceramic Engineering and Science Proceedings, vol. 31, Issue 1 (ed C. H. Drummond), John Wiley & Sons, Inc., Hoboken, NJ, USA. doi:10.1002/9780470769843.ch15.

"Canty Process Technology" brochure, date unknown, copy received in Apr. 2012 at American Institute of Chemical Engineers, Spring Meeting, Houston, TX.

Stevenson, "Foam Engineering: Fundamentals and Applications", Chapter 16, pp. 336-389, John Wiley & Sons (Mar. 13, 2012).

Clare et al., "Density and Surface Tension of Borate Containing Silicate Melts", Glass Technology—European Journal of Glass Science and Technology, Part A, pp. 59-62, vol. 44, No. 2, Apr. 1, 2003.

Seward, T.P., "Modeling of Glass Making Processes for Improved Efficiency", DE-FG07-96EE41262, Final Report, Mar. 31, 2003.

Conradt et al, Foaming behavior on glass melts, Glastechniche Berichte 60 (1987) Nr. 6, S. 189-201 Abstract Fraunhofer ISC.

Kim et al., "Foaming in Glass Melts Produced by Sodium Sulfate Decomposition under Isothermal Conditions", Journal of the American Ceramic Society, 74(3), pp. 551-555, 1991.

Kim et al., "Foaming in Glass Melts Produced by Sodium Sulfate Decomposition under Ramp Heating Conditions", Journal of the American Ceramic Society, 75(11), pp. 2959-2963, 1992.

Kim et al., "Effect of Furnace Atmosphere on E-glass Foaming", Journal of Non-Crystalline Solids, 352(50/51), pp. 5287-5295, 2006.

Van Limpt, et al., "Modelling the evaporation of boron species. Part 1. Alkali-free borosilicate glass melts", Glass Technology—European Journal of Glass Science and Technology, Part A, 52(3): pp. 77-87, 2011.

"Gamma Irradiators for Radiation Processing" Booklet, International Atomic Energy Agency, Vienna, Austria.

Higley, BA, Glass Melter System Technologies for Vitrification of High-Sodium-Content Low-Level, Radioactive, Liquid Wastes—Phase I: SBS Demonstration With Simulated Low-Level Waste—Final Test Report, Westinghouse Hanford Company.

Report for Treating Hanford LAW and WTP SW Simulants: Pilot Plan Mineralizing Flowsheet Apr. 2009, Department of Energy Environmental Management Consolidated Business Center by THOR Treatment Technologies, LLC.

"Glass Technologies—The Legacy of a Successful Public-Private Partnership", 2007, U.S. Department of Energy, pp. 1-32.

"Glass Melting Technology—A Technical and Economic Assessment," 2004, U.S. Department of Energy, pp. 1-292.

Rue, "Energy-Efficient Glass Melting—The Next Generation Melter", Gas Technology Institute, Project No. 20621 Final Report (2008).

"Glass Industry of the Future", United States Department of Energy, report 02-GA50113-03, pp. 1-17, Sep. 30, 2008.

Olabin, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.

Furman, BJ, ME 120 Experimental Methods Vibration Measurement, San Jose University Department of Mechanical and Aerospace Engineering.

* cited by examiner

APPARATUS, SYSTEMS AND METHODS FOR PROCESSING MOLTEN GLASS

CROSS-REFERENCE TO RELATED APPLICATIONS

This application may be related to the following United States non-provisional patent applications assigned to the assignee of the present application which are all incorporated by reference herein: Ser. No. 12/817,754, filed Jun. 17, 2010, now Pat. No. 8,769,992, issued Jul. 8, 2014; Ser. No. 13/267,990, now Pat. No. 8,997,525, issued Apr. 7, 2015, Ser. No. 13/268,028, now Pat. No. 8,875,544, issued Nov. 4, 2014, Ser. No. 13/268,098, now Pat. No. 8,707,740, issued Apr. 29, 2014, and Ser. No. 13/268,130, now Pat. No. 9,021,838, issued May 5, 2015, all four filed Oct. 7, 2011; Ser. No. 13/458,211, filed Apr. 27, 2012, now Pat. No. 9,145,319, issued Sep. 29, 2015; Ser. No. 13/493,170, now Pat. No. 8,707,739, issued Apr. 29, 2014 and Ser. No. 13/493,219, now Pat. No. 9,096,453, issued Aug. 4, 2015, both filed Jun. 11, 2012; Ser. No. 13/540,771, filed Jul. 3, 2012, now Pat. No. 9,032,760, issued May 19, 2015; Ser. Nos. 13/644,058; 13/644,104, now Pat. No. 9,096,452, issued Aug. 4, 2015; Ser. Nos. 13/633,979; 13/633,998, now Pat. No. 8,973,405, issued Mar. 10, 2015; and Ser. No. 13/644,039, now Pat. No. 8,991,215, issued Mar. 31, 2015, all five filed Oct. 3, 2012; Ser. No. 13/752,672, filed Jan. 29, 2013, now Pat. No. 9,115,017, issued Aug. 25, 2015; and Ser. No. 13/689,318, filed Nov. 29, 2013 now Pat. No. 9,227,865, issued Jan. 5, 2016.

BACKGROUND INFORMATION

Technical Field

The present disclosure relates generally to the field of melting glass-forming materials using a melter, and methods of use thereof to produce molten glass, and more specifically to methods and systems for making well-fined molten glass, and glass products therefrom, using one or more melters, for example submerged combustion melters.

Background Art

A submerged combustion melter (SCM) may be employed to melt glass batch and/or waste glass materials to produce molten glass by passing oxygen, oxygen-enriched mixtures, or air along with a liquid, gaseous and/or particulate fuel (some of which may be in the glass-forming materials), directly into a molten pool of glass, usually through burners submerged in a glass melt pool. The introduction of high flow rates of products of combustion of the oxidant and fuel into the molten glass, and the expansion of the gases cause rapid melting of the glass batch and much turbulence and foaming.

Molten glass produced from an SCM is generally a homogeneous mixture of molten glass and fine bubbles. The bubbles may occupy up to 40 percent or more of the volume of molten glass produced with fine bubbles distributed throughout the molten mass of glass. For glass forming operations requiring well-fined (essentially void free) molten glass, a very large number of bubbles must be removed from the molten glass. The typical procedure for removing the bubbles is to allow a long enough residence time in one or more apparatus downstream of the SCM for the bubbles to rise to the surface and burst. Clearing bubbles from the molten glass is referred to as "fining" within the glass industry. Experience with SCMs has shown that the fining process can be very slow due to the bubbles collecting at the molten glass surface forming a layer of stable foam thereon.

Formation of this foam layer in downstream fining chambers retards the fining mechanism as well as the heat penetration into the glass from fining chamber combustion burners firing above the glass.

Use of skimmers within the foam layer has been used to hold back some of the upper foam layers allowing the lower, less foamy layers to pass through to flow channels downstream of the SCM. These efforts have been somewhat effective but may require multiple skimmers to obtain a foam free glass layer and surface. In addition, the skimmers are prone to failure during operation making them no longer useful in holding back the upper foam layers and can fall into and partially block downstream flow channels, impeding some or all of the glass flow to downstream apparatus such as forming stations. It is also conventional to use a submerged throat positioned between a melter and a downstream channel, or between first and second sections of a melter; however, these throats are used primarily to serve as a demarcation between an upstream melting region and a downstream fining region. Other methods use a flat-bottom refining or conditioning channel downstream of the melter. In some cases the flat-bottom refining or conditioning channel is movable into and out of fluid communication with the effluent of the melter therefrom, therefore decoupling the melter and downstream glass forming apparatus. However, such arrangements require long refiners and long residence times to sufficiently remove entrained bubbles.

At least for these reasons, it would be an advance in the glass manufacturing art to solve one or more problems of bubble removal and/or surface foam buildup, preferably both problems, while increasing operational flexibility during processing molten glass having a high concentration of gas bubbles such as produced by submerged combustion melting, thereby allowing formation of well-fined molten glass, and glass products using the well-fined molten glass.

SUMMARY

In accordance with the present disclosure, apparatus, systems and methods are described for reducing or eliminating glass foam and/or entrained bubbles produced during melting of glass-forming materials, in particular in a submerged combustion melter.

A first aspect of the disclosure is a method comprising:
routing a molten mass of glass having bubbles therein to an inlet transition region of a fining chamber, the fining chamber having a longitudinal axis and defined at least by a glass-contact refractory floor and a refractory sidewall structure, the inlet transition region having a width, depth, and length, the length measured along a line parallel to the longitudinal axis, the inlet transition region width increasing from an initial width to a final width, and the inlet transition region depth decreasing from an initial depth to a final depth, thus forming a partially refined molten glass;
routing the partially refined molten glass over a glass-contact refractory raised curb in the fining chamber (preferably, but not necessarily, placed substantially perpendicular to the longitudinal axis), the raised curb having a curb width equal to the final width of the inlet transition region, a curb length less than the length of the inlet transition region, and a curb height forming a shallowest depth portion of the fining chamber and separating the fining chamber into the inlet transition region and a primary fining region, thus forming a second partially refined molten glass; and routing the second partially refined molten glass through the primary fining region, the primary fining region having a constant depth greater than the shallowest depth but less than the depth of the inlet transition region.

A second aspect of the disclosure is an apparatus comprising:

a fining chamber, the fining chamber having a longitudinal axis and defined at least by a refractory floor and a sidewall structure, the fining chamber comprising an inlet transition region having a width, depth, and length, the length measured along a line parallel to the longitudinal axis, the inlet transition region width increasing from an initial width to a final width, and the inlet transition region depth decreasing from an initial depth to a final depth;

a raised curb in the fining chamber (preferably, but not necessarily) placed substantially perpendicular to the longitudinal axis, the raised curb having a curb width equal to the final width of the inlet transition region, a curb length less than the length of the inlet transition region, and a curb height forming a shallowest depth portion of the fining chamber, the raised curb separating the fining chamber into the inlet transition region and a primary fining region, the primary fining region defined by the floor and sidewall structure, the primary fining region having a constant width equal to the final width of the inlet transition region, and a constant depth greater than the shallowest depth but less than the depth of the inlet transition region.

A third aspect of the disclosure is a system comprising:

a fining chamber, the fining chamber having a longitudinal axis and defined at least by a refractory floor and a sidewall structure, the fining chamber comprising an inlet transition region having a width, depth, and length, the length measured along a line parallel to the longitudinal axis, the inlet transition region width increasing from an initial width to a final width, and the inlet transition region depth decreasing from an initial depth to a final depth;

a raised curb in the fining chamber (preferably placed substantially perpendicular to the longitudinal axis), the raised curb having a curb width equal to the final width of the inlet transition region, a curb length less than the length of the inlet transition region, and a curb height forming a shallowest depth portion of the fining chamber, the raised curb separating the fining chamber into the inlet transition region and a primary fining region, the primary fining region defined by the floor and sidewall structure, the primary fining region having a constant width equal to the final width of the inlet transition region, and a constant depth greater than the shallowest depth but less than the depth of the inlet transition region;

a submerged combustion melter fluidly connected to the fining chamber to produce the molten mass of glass having bubbles therein from glass-forming materials; and an exit transition region of the fining chamber, the exit transition region having a width, a length, and a depth, wherein the width decreases from an initial width equal to the width of the primary fining region to a final width that is less than the initial width of the exit transition region by a factor of 0.5 or less.

The raised curb helps spread or distribute the molten glass across containing bubbles across the width of the primary fining chamber and minimize flow concentrating down the center (minimize channeling). Apparatus, systems and methods of this disclosure may accept a molten mass of glass having bubbles therein formed from any melting apparatus or system, including submerged combustion melters (SCMs) and conventional (non-submerged combustion and/or electrically heated) laminar flow glass tank furnaces. An SCM melts glass-forming materials to produce a turbulent molten mass of foamed glass, the SCM comprising a roof, a floor, a sidewall structure connecting the roof and floor, and an outlet for the molten mass of foamed glass in the floor and/or the sidewall structure. In other aspects, the present disclosure relates to methods of making glass products using a system either comprising, consisting essentially of, or consisting of at least one source of molten glass containing bubbles, and one or more fining chambers of the present disclosure. Optionally, apparatus, systems, and methods of this disclosure may include one or more foam layer impingement combustion burners, and/or one or more non-impingement heating combustion burners, and/or one or more Joulean heating elements in the molten mass of glass having bubbles therein, and/or in partially refined versions thereof. For example, one or more high momentum foam layer impingement combustion burners may be positioned immediately upstream of the raised curb, in either the roof or sidewall structure, or both, to burst at least some foamed material retained behind the raised curb and floating on top of the molten mass of glass by heat and/or direct impingement thereon, and one or more low momentum, non-impingement combustion burners may be positioned immediately downstream of the raised curb, in either the roof, the sidewall structure, or both, and positioned to transfer heat to the molten mass of glass.

Systems and methods of this disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which:

It is to be noted, however, that the appended drawings of FIGS. 1-5 and 8-10 may not be to scale and FIGS. 1-10 illustrate only typical embodiments of this disclosure, and are therefore not to be considered limiting of its scope, for the disclosure may admit to other equally effective embodiments.

DETAILED DESCRIPTION

Figure 1:
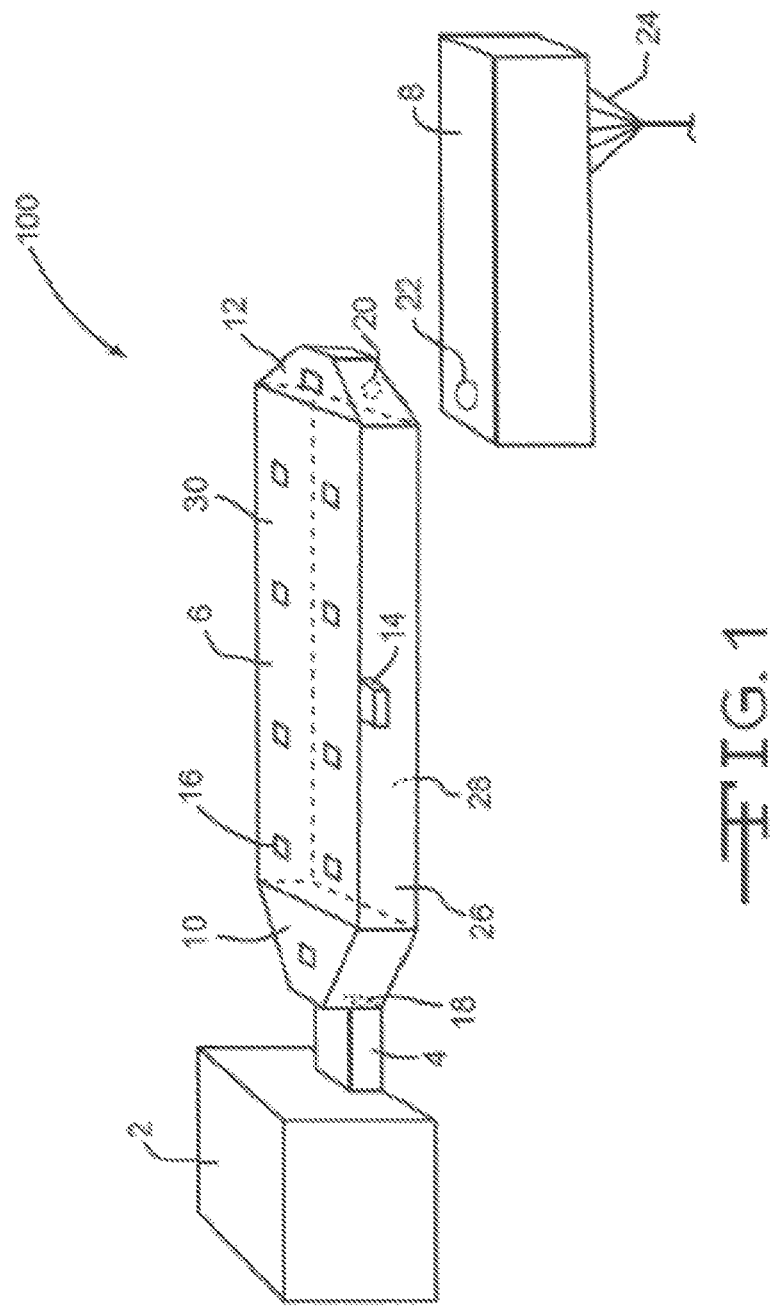
FIG. 1 is a schematic perspective view of a system of this disclosure.

In the following description, numerous details are set forth to provide an understanding of the disclosed apparatus, systems, and methods. However, it will be understood by those skilled in the art that the apparatus, systems, and methods covered by the claims may be practiced without these details and that numerous variations or modifications from the specifically described embodiments may be possible and are deemed within the claims. All U.S. patent applications and U.S. patents referenced herein are hereby explicitly incorporated herein by reference. In the event definitions of terms in the referenced patents and applications conflict with how those terms are defined in the present application, the definitions for those terms that are provided in the present application shall be deemed controlling.

As explained briefly in the Background, bubbles may occupy up to 40 percent or more of the volume of the turbulent molten glass produced by an SCM, with fine bubbles distributed throughout the molten mass of glass. For glass forming operations requiring well-fined (essentially void free) molten glass, a very large number of bubbles must be removed from the molten glass. Experience with SCMs has shown that the fining process can be very slow due to the bubbles collecting at the molten glass surface forming a layer of stable foam thereon. Formation of this foam layer in downstream fining chambers retards the fining mechanism as well as the heat penetration into the glass from fining chamber heating systems, such as combustion burners firing above the glass and/or electrical joule heating below the glass. Use of skimmers within the foam layer to hold back some of the upper foam layers allowing the lower, less foamy layers to pass through to later sections of channels downstream of the SCM has been somewhat successful but suffers from several drawbacks.

It has been discovered that the use of a specially designed fining chamber downstream of the SCM (or other melting furnace or source of molten glass containing bubbles) may fully accomplish fining molten glass in a simple, effective way. The fining chamber includes an inlet transition region including a width that increases from an initial width to a final width, and depth that decreases from an initial depth to a final depth, followed by a raised curb, and finally to a flat constant depth primary fining region having an outlet in the floor at or near the distal end of the fining chamber. The depth of the primary fining region is greater than the raised curb, but less than the inlet transition region depth. The raised curb plays a very important role in distributing/spreading the glass and/or bubble flow across the width of the primary fining region of the fining chamber after the initial width increase experienced in the inlet transition region. In the absence of the raised curb, the molten glass flow would tend to flow down the centerline of the primary fining region and the additional width of the primary fining region would be wasted. Thus, one alternative to a constant height curb is to have it higher in the center than at the sides to force the molten glass to flow toward the sidewalls.

In accordance with apparatus, systems, and methods of the present disclosure, the fining chamber floor comprises, consists essentially of, or consists of a glass-contact refractory over one more refractory or brick layers. The fining chamber walls (and optional roof or ceiling) may also include glass-contact refractory. The roof or ceiling may include one or more adjustable roof-mounted high-momentum or low-momentum combustion burners (air/fuel, enriched oxygen/fuel, or combination thereof) such as described and illustrated in assignee's Ser. No. 13/493,219, filed Jun. 11, 2012, now Pat. No. 9,096,453, issued Aug. 4, 2015; Ser. No. 13/268,130, filed Oct. 7, 2011, now Pat. No. 9,021,838, issued May 5, 2015; and Ser. No. 3/493,170, filed Jun. 11, 2012, now Pat. No. 8,707,739, issued Apr. 29, 2014 for additional operational flexibility. High-momentum burners may be used as foam layer impingement burners, while low-momentum burners may be used for heating or maintaining temperature of the molten mass of glass having bubbles therein, or partially refined versions thereof. One or more electrical Joulean heating elements may be employed for heating purposes in the fining chamber (in any one or more locations), this technique being especially useful for high pull rate methods of the disclosure, where the electrical Joulean heating elements may enhance the fining of the molten mass of glass having bubbles therein.

In certain apparatus, systems, and methods of the present disclosure, one or more sections of the glass-contact refractory may include, or be replaced by one or more precious metals. For example, the raised curb may comprise, consist essentially of, or consist of a glass-contact precious metal, or may be clad (lined) with a layer of such material. In certain other embodiments, the glass-contact refractory in the inlet transition region may comprise, consist essentially of, or consist of a glass-contact precious metal, or may be clad (lined) with a layer of such material.

Certain methods of this disclosure may further comprise, consist essentially of, or consist of separating the second partially refined molten glass into an upper phase consisting essentially of glass foam and a lower phase consisting essentially of molten glass as the second partially refined molten glass flows toward an exit transition region of the fining chamber, the exit transition region having a width, a length, and a depth, wherein the width decreases from an initial width equal to the width of the primary fining region to a final width that is less than the initial width by a factor of 0.5 or less. Certain methods of this disclosure may further comprise, consist essentially of, or consist of routing the molten glass through and out of at least one passage in the exit transition region that is positioned lower than a phase boundary between the upper and lower phases in the exit transition region. Certain methods of this disclosure may further comprise, consist essentially of, or consist of temperature homogenizing the molten glass as it passes through at least one of the inlet transition region, the primary fining region, and the exit transition region. Certain methods of this disclosure may further comprise, consist essentially of, or consist of feeding at least a portion of the temperature homogenized molten glass to one or more glass forming stations. Certain methods of this disclosure may further comprise, consist essentially of, or consist of methods wherein the glass forming stations are selected from the group consisting of fiber forming spinnerets, fiberization stations, and non-glass fiber product forming stations. Certain methods of this disclosure may further comprise, consist essentially of, or consist of wherein the step of routing the molten mass of glass having bubbles therein to the inlet transition region of the fining chamber comprises flowing the molten mass of glass through at least one inlet aperture of the inlet transition region, wherein 100 percent of the inlet aperture is lower than a level of molten glass in the inlet transition region. Certain methods of this disclosure may further comprise, consist essentially of, or consist of controllably flowing at least some of the molten glass by gravity through at least one aperture in the floor of the exit transition region upon a planned or unplanned condition. Certain methods of this disclosure may further comprise, consist essentially of, or consist of cooling the sidewall structure using fluid-cooling of the sidewall structure sufficient to form a frozen glass layer on inside surfaces of the sidewall structure. Certain methods of this disclosure may further comprise, consist essentially of, or consist of cooling the molten glass as it passes through the at least one passage to a temperature just above a desired glass product forming temperature. Certain methods of the present disclosure may further comprise, consist essentially of, or consist of melting glass-forming materials to produce a turbulent molten mass of foamed glass in an SCM to produce the molten mass of glass having bubbles therein.

The length, width, height, and depth dimensions of the inlet transition region may vary widely, as may the width, length, and depth of the an exit transition region of the fining chamber. The exit transition region may have a width, a length, and a depth, wherein the width decreases from an initial width equal to the width of the primary fining region to a final width that is less than the initial width of the exit transition region by a factor of 0.5 or less.

Certain apparatus embodiments may further comprise, consist essentially of, or consist of an exit transition region of the fining chamber, the exit transition region having a width, a length, and a depth, wherein the width decreases from an initial width equal to the width of the primary fining region to a final width that is less than the initial width of the exit transition region by a factor of 0.5 or less. Certain apparatus embodiments may further comprise, consist essentially of, or consist of wherein the exit transition region further comprises at least one passage for routing the molten glass through and out of the exit transition region, the at least one passage positioned lower than a phase boundary between the upper and lower phases in the exit transition region. Certain apparatus embodiments may further comprise, consist essentially of, or consist of a temperature homogenizing and/or momentum transferring elements selected from the group consisting of one or more roof-mounted burners and one or more electric coils mounted in at least one of the inlet transition region, the primary fining region, and the exit transition region.

Certain system embodiments may further comprise, consist essentially of, or consist of a submerged combustion melter fluidly connected to the fining chamber apparatus to produce the molten mass of glass having bubbles therein from glass-forming materials. Certain system embodiments may further comprise, consist essentially of, or consist of one or more glass forming stations fluidly connected to the exit transition region of the fining chamber. Certain system embodiments may further comprise, consist essentially of, or consist of wherein the glass forming stations are selected from the group consisting of fiber forming spinnerets, fiberization stations, and non-glass fiber product forming stations. Certain apparatus embodiments may further comprise, consist essentially of, or consist of wherein the inlet transition region comprises at least one inlet aperture for routing the molten mass of glass having bubbles therein to the inlet transition region, wherein 100 percent of the inlet aperture is positioned lower than a level of molten glass in the inlet transition region. Certain apparatus embodiments may further comprise, consist essentially of, or consist of at least one controllable aperture in the floor of the exit transition for controllably flowing at least some of the molten glass by gravity therethrough upon a planned or unplanned condition. Certain apparatus embodiments may further comprise, consist essentially of, or consist of wherein one or more walls of the sidewall structure comprises fluid passages sufficient to pass cooling fluid through the one or more walls of the sidewall structure. Certain apparatus embodiments may further comprise, consist essentially of, or consist of wherein the exit transition region comprises fluid passages sufficient to pass cooling fluid therethrough for cooling the molten glass as it passes through the at least one passage to a temperature just above a desired glass product forming temperature.

Certain apparatus embodiments may further comprise, consist essentially of, or consist of wherein the inlet transition region floor comprises a planar floor that slants upward in the flow direction at an angle "γ" to horizontal. Certain apparatus embodiments may further comprise, consist essentially of, or consist of wherein the inlet transition region floor comprises two or more planar horizontal steps of different heights, resulting in different depths of molten glass therein, wherein the steps increase in height (decrease in depth) in the flow direction. Certain apparatus embodiments may further comprise, consist essentially of, or consist of wherein the steps have an upper most layer of refractory adhered thereto, the refractory shaped to have a smooth transition from step to step, the refractory of the upper most layer also being used to form the raised curb and an upper-most layer of the fining chamber floor in the primary fining region and the exit transition region. Certain apparatus embodiments may further comprise, consist essentially of, or consist of wherein the inlet transition region floor comprises a non-planar floor that curves generally upward (concave or convex) in the flow direction. Certain apparatus embodiments may further comprise, consist essentially of, or consist of wherein the inlet transition region width increases linearly from its initial width to its final width, the left and right sidewalls of the inlet transition region angled at angles "α" and "β" to the longitudinal axis, and the exit transition region width decreases linearly from its initial width to its final width, the left and right sidewalls of the exit transition region angled at angles "α*" and "β*" to the longitudinal axis, wherein "α" and "β" are the same or different and "α*" and "β*" are the same or different.

In certain apparatus embodiments one or more regions of the fining chamber may include one or more Joulean heating elements to enhance the fining action, especially during periods of high pull rate (high flow through the fining chamber). The elements could be positioned underneath the foam layer and increase the rise rate of the bubbles. Positioning electrical Joulean elements below the foam layer during high pull conditions may minimize the impact of the foam layer on heat transfer from combustion burners above the foam layer. For example, one or more Joulean heating elements could be positioned randomly or non-randomly in the primary fining chamber, positioned under the level of molten mass of glass and bubbles. One or more Joulean heating elements could be positioned in the inlet transition and/or exit transition regions. In order that the elements are underneath the foam layer, the elements may be positioned on, or just above (for example, about 2 inches or less above) the floor of the region in question.

Various terms are used throughout this disclosure. "Submerged" as used herein means that combustion gases emanate from a combustion burner exit that is under the level of the molten glass, and "non-submerged" means that combustion gases do not emanate from combustion burner exits under the level of molten glass, whether in an SCM or downstream apparatus. Both submerged and non-submerged burners may be roof-mounted, floor-mounted, wall-mounted, or any combination thereof (for example, two floor mounted burners and one wall mounted burner). "SC" as used herein means "submerged combustion" unless otherwise specifically noted, and "SCM" means submerged combustion melter unless otherwise specifically noted.

The terms "foam" and "foamy" include froths, spume, suds, heads, fluffs, fizzes, lathers, effervesces, layer and the like. The term "bubble" means a thin, shaped, gas-filled film of molten glass. The shape may be spherical, hemispherical, rectangular, polyhedral, ovoid, and the like. The gas or "bubble atmosphere" in the gas-filled SC bubbles may comprise oxygen or other oxidants, nitrogen, combustion products (including but not limited to, carbon dioxide, carbon monoxide, $NO_N$, $SO_x$, $H_2S$, and water), reaction products of glass-forming ingredients (for example, but not limited to, sand (primarily $SiO_2$), clay, limestone (primarily $CaCO_3$), burnt dolomitic lime, borax and boric acid, and the like. Bubbles may include solids particles, for example soot particles, either in the film, the gas inside the film, or both. The term "glass foam" means foam where the liquid film comprises molten glass. "Glass level" means the distance measured from the floor of a fining chamber to the upper liquid level of the molten glass, and "foam level" means the distance measured from the top of the atmosphere above the foam layer to the upper surface of the foam layer. "Foam height" (equivalent to foam thickness) is the distance measured between the glass level and foam level. "Depth" of a fining chamber region means the distance from the top of the molten glass and/or foam to the floor of the region in question. "Length" means distance measured parallel to the longitudinal axis of the fining chamber, while "width" is measured perpendicular to the longitudinal axis of the fining chamber and in a plane substantially parallel to the level of the molten glass/foam in the fining chamber.

As used herein the term "combustion" means deflagration-type combustion unless other types of combustion are specifically noted, such as detonation-type combustion. Deflagration is sub-sonic combustion that usually propagates through thermal conductivity; hot burning material heats the next layer of cold material and ignites it. Detonation is supersonic and primarily propagates through shock. As used herein the terms "combustion gases" and "combustion products" means substantially gaseous mixtures of combusted fuel, any excess oxidant, and combustion products, such as oxides of carbon (such as carbon monoxide, carbon dioxide), oxides of nitrogen, oxides of sulfur, and water, whether from deflagration, detonation, or combination thereof. Combustion products may include liquids and solids, for example soot and unburned or non-combusted fuels.

"Oxidant" as used herein includes air and gases having the same molar concentrations of oxygen and nitrogen as air (synthetic air), oxygen-enriched air (air having oxygen concentration greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof.

The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

The primary fining region of the fining chamber is defined at least by a floor and a wall structure extending upwards from the floor to form a space in which molten glass may be present, whether flowing or not. In certain embodiments primary fining region of the fining chamber may include a roof and a wall structure connecting the floor and roof. The primary fining region of the fining chamber may have any operable cross-sectional shape (for example, but not limited to, rectangular, oval, circular, trapezoidal, hexagonal, and the like) and any flow path shape (for example, but not limited to, straight, zigzag, curved, and combinations thereof), as long as the depth of the primary fining region is greater than the depth of the raised curb and less than the depth of the inlet transition region. The width may be constant or changing from inlet to outlet of the primary fining chamber. The length may also depend on the Reynolds number of the molten glass flowing over the raised curb. Higher Reynolds numbers may require longer primary fining regions to achieve the desired temperature homogenization. As used herein the term "well-fined" means that in certain embodiments the molten glass has less than 15 bubbles per $cm^3$, or in some embodiments less than 2 bubbles per $cm^3$, or has a density within 95 percent of the density of the glass being produced with no bubbles, or in certain embodiments has a density within 99 percent of the density of the glass being produced with no bubbles.

Fining chambers and associated structures, as well as conduits used in burners and devices for delivery of compositions useful in systems and methods of the present disclosure may be comprised of metal, ceramic, ceramic-lined metal, or combination thereof. Suitable metals include stainless steels, for example, but not limited to, 304 and 316 steel, as well as titanium alloys, aluminum alloys, and the like. Suitable materials and thickness for the glass-contact refractory and precious metals, if present, are discussed herein below. In any particular system and method, the fining chamber geometry and associated structural features may be influenced by the type of glass being produced and degree of foaming.

Certain submerged and non-submerged combustion burners, certain components in and/or protruding through one or more of the floor, roof, and sidewall structure configured to heat or maintain temperature of the foamed glass in the fining chamber, SCM or otherwise, may be fluid-cooled, and in the case of burners may include first and second (or more) concentric conduits. In the case of burners, the first conduit may be fluidly connected at one end to a source of fuel, the second conduit may be fluidly connected to a source of oxidant, and a third substantially concentric conduit may connect to a source of cooling fluid.

Certain systems of this disclosure may comprise one or more non-submerged burners. Suitable non-submerged combustion burners may comprise a fuel inlet conduit having an exit nozzle, the conduit and nozzle inserted into a cavity of a ceramic burner block, the ceramic burner block in turn inserted into either the roof or the wall structure, or both the roof and wall structure of the fining chamber.

In certain apparatus, systems, and methods one or more burners may be adjustable with respect to direction of flow of the combustion products. Adjustment may be via automatic, semi-automatic, or manual control. Certain apparatus, system, and method embodiments may comprise a burner mount that mounts the burner in the wall structure, roof, or floor of the fining chamber comprising a refractory, or refractory-lined ball joint or ball turret. Other burner mounts may comprise rails mounted in slots in the wall or roof. In yet other embodiments the burners may be mounted outside of the fining chamber, on supports that allow adjustment of the combustion products flow direction. Useable supports include those comprising ball joints, cradles, rails, and the like.

In certain apparatus, systems, and methods of the present disclosure, the fining chamber may comprise, consist essentially of, or consist of one or more foam destruction devices as described in assignee's co-pending application Ser. No. 13/644,104, filed Oct. 3, 2012, now Pat. No. 9,096,452, issued Aug. 4, 2015.

Specific non-limiting apparatus, system, and method embodiments in accordance with the present disclosure will now be presented in conjunction with the attached drawing figures. The same numerals are used for the same or similar features in the various figures. In the views illustrated in the drawing figures, it will be understood in the case of FIGS. 1-5 and 9-10 that these figures are schematic in nature, and certain conventional features may not be illustrated in all embodiments in order to illustrate more clearly the key features of each embodiment.

FIG. 1 is a schematic perspective view, partially in phantom, of one non-limiting system embodiment 100 of this disclosure. System 100 includes a source 2 producing molten glass with bubbles, such as an SCM, conventional melter, or other apparatus. Source 2 routes molten glass containing bubbles through a melter exit structure 4 and to a fining chamber 6. Fining chamber 6 may in turn route reduced foam molten glass to a glass forming unit 8. Fining chamber 6 includes an inlet transition region 10 ("ITR") and an exit transition region 12 ("ETR"). Fining chamber 6 may include one or more vents 14, and may further include one or more apertures 16 for heat and/or momentum transfer combustion burners and/or one or more apertures for inserting Joulean heating elements (the burners and Joulean elements themselves are not illustrated for clarity, it being understood that when the burners and/or Joulean elements are not present the apertures 16 and apertures for one/or more Joulean elements are filled with appropriate closure elements). In embodiment 100, ten burner ports 16 are illustrated, one in the roof of inlet transition region 10, one in the roof of exit transition region 12, and eight in the roof of the primary fining chamber, defined as the region between the inlet and exit transition regions 10, 12. Also illustrated in phantom is an ITR inlet passage 18, and an ETR outlet passage 20, as well as a forming unit inlet passage 22. Forming unit 8 may include a number of spinnerets producing fibers 24, or other formed glass products. Fining chamber 6 includes in embodiment 100 a sidewall structure 26 connecting a floor 28 and a roof 30.

Figure 2:
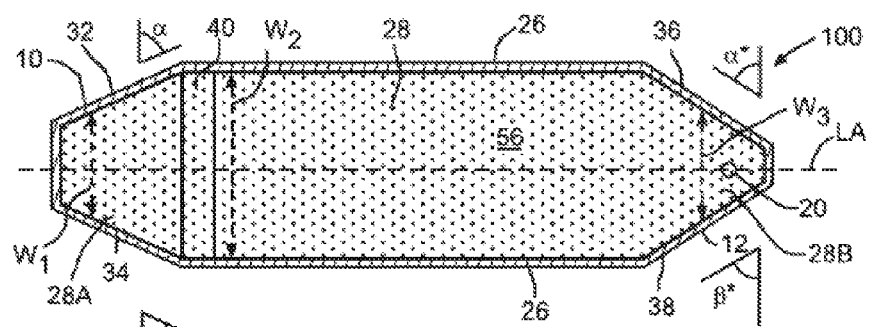
FIG. 2 is a schematic plan view of the fining chamber of FIG. 1 with the roof removed.
Figure 3:
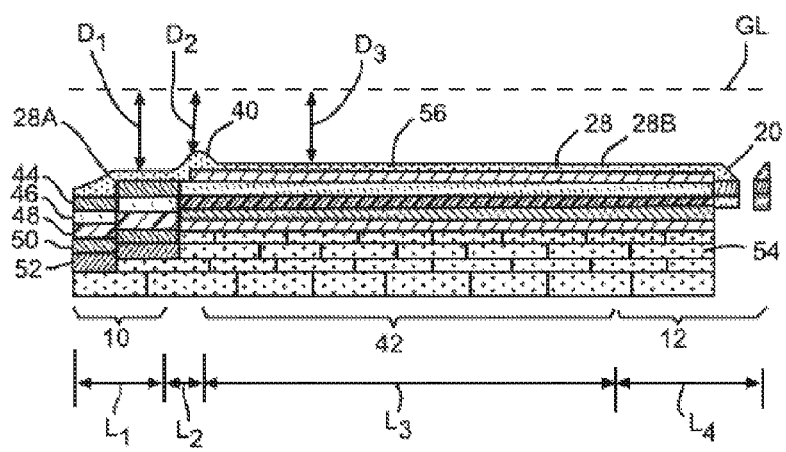
FIG. 3 is a schematic side cross-sectional view of the fining chamber of FIG. 2.

Referring now to FIGS. 2 and 3, FIG. 2 is a schematic plan view of the fining chamber 6 of FIG. 1 with the roof removed, and FIG. 3 is a schematic side cross-sectional view of the fining chamber 6 of FIG. 2, also with roof removed. The floor 28 includes floor 28A in the ITR 10, and floor 28B in the ETR 12. ITR 10 includes angled left and right sidewalls 32, 34, angled at angles "α" and "β" respectively to a line perpendicular to fining chamber 6 longitudinal axis LA as illustrated. ETR 12 also has angled left and right sidewalls 36, 38 in this embodiment, angled at angles "α*" and "β*" respectively to a line perpendicular to fining chamber 6 longitudinal axis LA as illustrated. Also illustrated is a raised curb 40, perhaps more easily viewed in the view of FIG. 3. ITR 10 has an increasing width W1, while ETR 12 has a decreasing width W3. Raised curb 40 has a width W2 equal to the final width of ITR 10 and to the beginning width of ETR 12. Angles α and β may be the same or different, but are preferably the same, and may independently range from about 20 to 80 degrees, all ranges from 20 to 80 degrees beings explicitly disclosed herein. Angles α* and β* may be the same or different, but are preferably the same, and may independently range from about 20 to 80 degrees, all ranges from 20 to 80 degrees beings explicitly disclosed herein. For example, α and β may be the same and each range from about 30 to about 60 degrees, or from about 35 to about 55 degrees, or from about 40 to about 50 degrees. For example, α* and β* may be the same and each range from about 30 to about 60 degrees, or from about 35 to about 55 degrees, or from about 40 to about 50 degrees. In certain embodiments angles α, β, α*, and β* may all be the same, such as 45 degrees.

Figure 8:
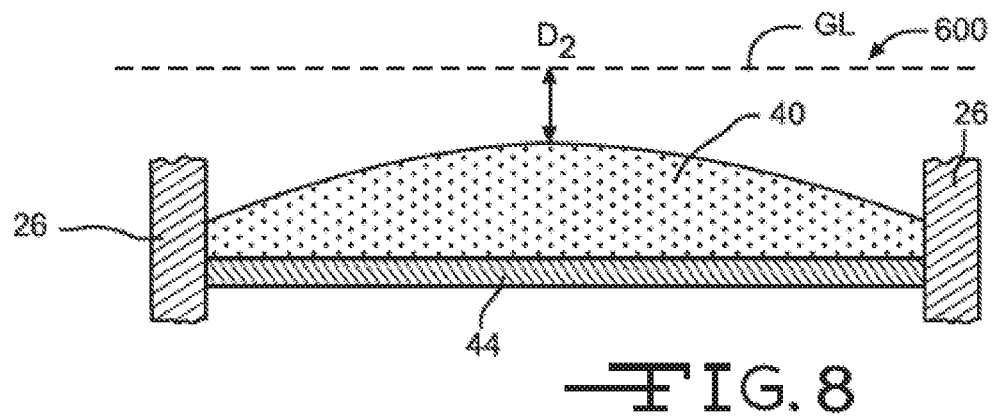
FIG. 8 is a schematic cross-sectional view, and FIGS. 9 and 10 schematic plan views of three alternative embodiments.
Figure 9:
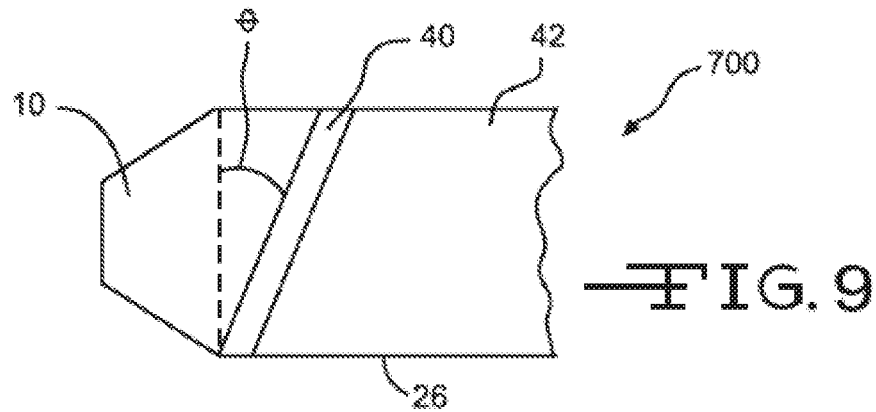
Figure 10:
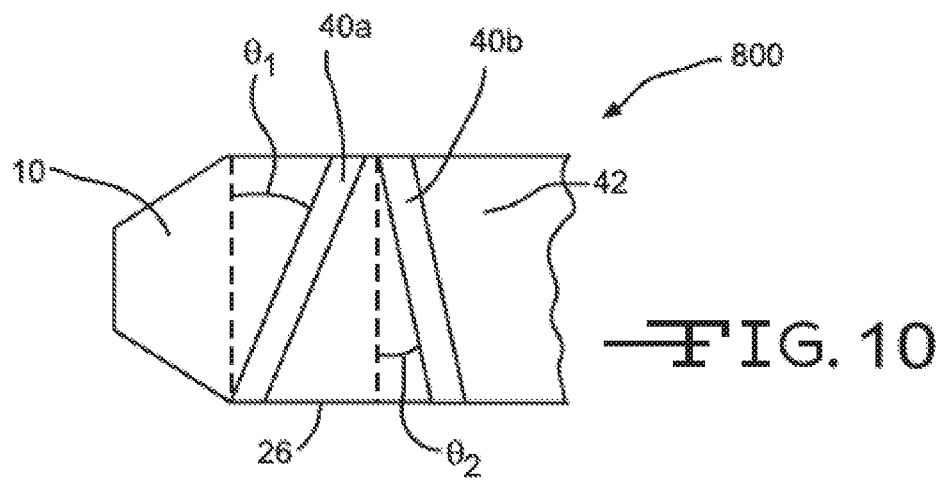

FIG. 3 illustrates certain other features of the disclosure, namely, lengths and depths of certain regions of the fining chamber of embodiment 100. Depths are indicated as D1, D2, D3, with D1 indicating depth of ITR 10, D2 indicating depth of raised curb 40, and D3 indicating depth of primary fining region 42 and ETR 12, all depths measured from a glass line "GL" indicated as a dashed line, it being understood that if the fining chamber is full of molten glass up to its roof, then GL represents the roof. The primary feature is that the distances are related as D2<D3<D1. As mentioned previously, in the absence of raised curb 40, the molten glass flow would tend to flow down the centerline of primary fining region 42 and the additional width of primary fining region 42 would be wasted. Thus, one alternative to a constant height raised curb 40 is to have it higher in the center than at the sidewalls 26 to force the molten glass to flow toward the sidewalls, as illustrated schematically in embodiment 600, FIG. 8. For example, expressed as depth D2, D2 may be least (raised curb 40 is highest) at the longitudinal axis LA, and D2 may be greatest (raised curb is lowest) at sidewalls 26, with gradually increasing value of D2 from the LA to sidewalls 26. In such an embodiment, the value of D2 at LA may one half the value of D2 at sidewalls 26. Various lengths are also illustrated in FIG. 3, with L1 being the length of ITR 10, L2 being length of raised curb 40, L3 being length of primary fining chamber 42, and L4 being length of ETR 12. These lengths are related as L2<L1, L2<L4, and L2<L3, with L3 >L1, L3>L4, and L3>L2, preferably L3>5L2, or L3>10L2. Further illustrated in FIG. 3 are several brick or other refractory layers 44, 46, 48, 50, 52, and 54, with these layers being stepped in the ITR 10 to support the decreasing depth feature of ITR 10. Glass-contact refractory 56 is illustrated, this material typically spread over layer 44 in ITR 10, ETR 12, raised curb 40, and primary fining region 42 while still moldable, and shaped as illustrated to make a transition from ITR 10 to raised curb 40. Raised curb 40 may be totally composed of glass-contacted refractory 56, or may be built up with layers of non-glass-contact refractory, as long as a glass-contact refractory layer is on top. FIGS. 9 and 10 illustrate schematically two other fining chamber embodiments 700, 800. FIG. 9 illustrates that raised curb 40 may be angled at an angle θ with respect to a line perpendicular to the longitudinal axis of the fining chamber, with angle θ being no more than about 20 degrees. Such an arrangement may be useful if, for example, a foam impingement burner is positioned on the left side of the ITR just upstream of raised curb 40. Another arrangement is illustrated schematically in FIG. 10, where a first raised curb 40a is positioned at a first angle $θ_1$ and a second raised curb 40b is positioned downstream at an angle $\theta_2$, with angles $\theta_1$ and $\theta_2$, being the same or different. Oppositely positioned foam impingement burners may be used in this embodiment as well. Such an arrangement of raised curbs may increase residence time of molten glass by forcing a serpentine route.

Figure 4:
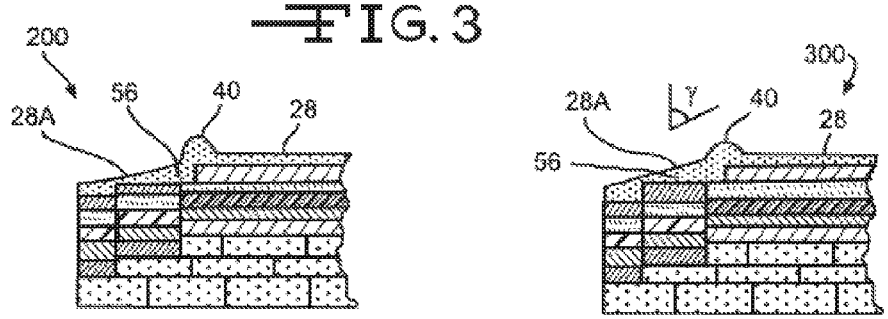
FIGS. 4 and 5 are schematic side cross-sectional views of alternative constructions of inlet transition region of the fining chamber of FIGS. 2 and 3.
Figure 5:
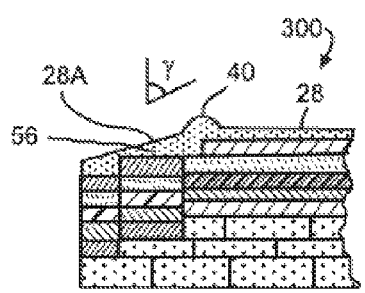

FIGS. 4 and 5 are schematic side cross-sectional views of alternative embodiments 200, 300 of inlet transition region 10 of the fining chamber of FIGS. 2 and 3. Embodiment 200 illustrated in FIG. 4 illustrates a concave-shaped floor 28A, while embodiment 300 illustrated in FIG. 5 illustrates an inclined plane shape for floor 28A, which may be angled at an angle $\gamma$, which may range from about 30 to about 80 degrees, or from about 40 to about 70 degrees, or from about 45 to about 55 degrees.

Figure 6:
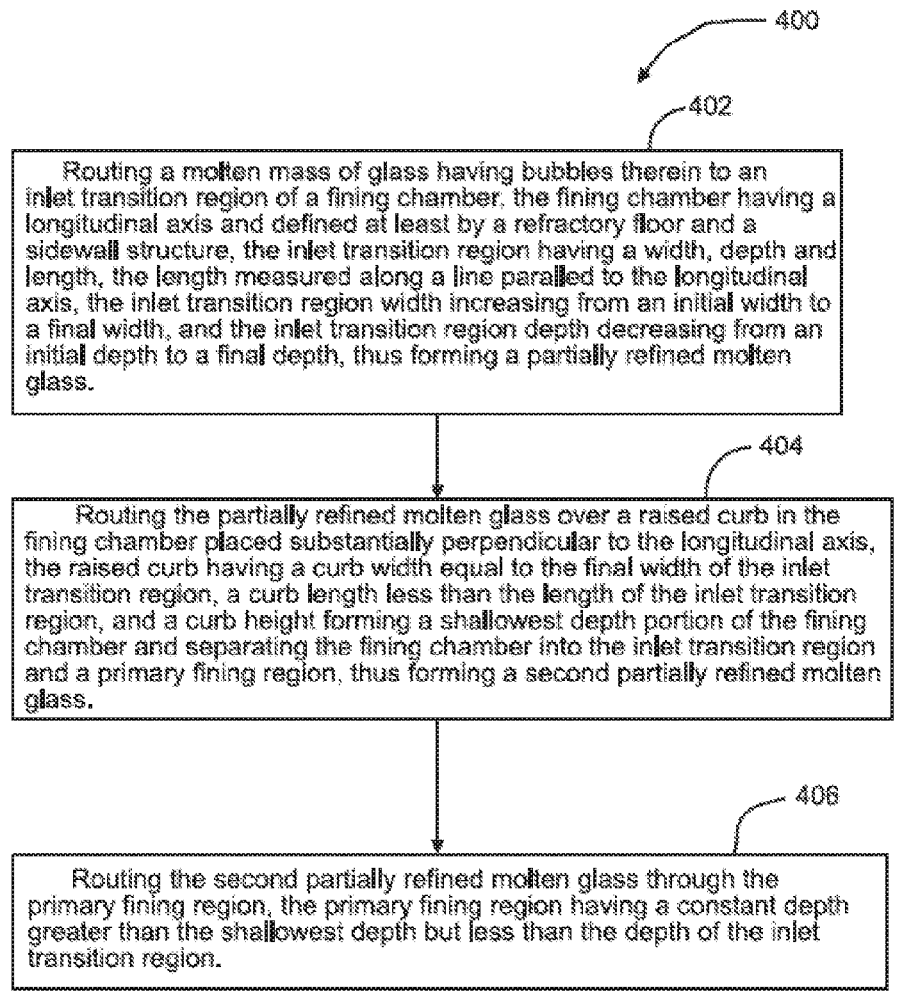
FIGS. 6 (method of fining) and 7 (method of making glass products) are logic diagrams of two methods in accordance with the present disclosure.
Figure 7:
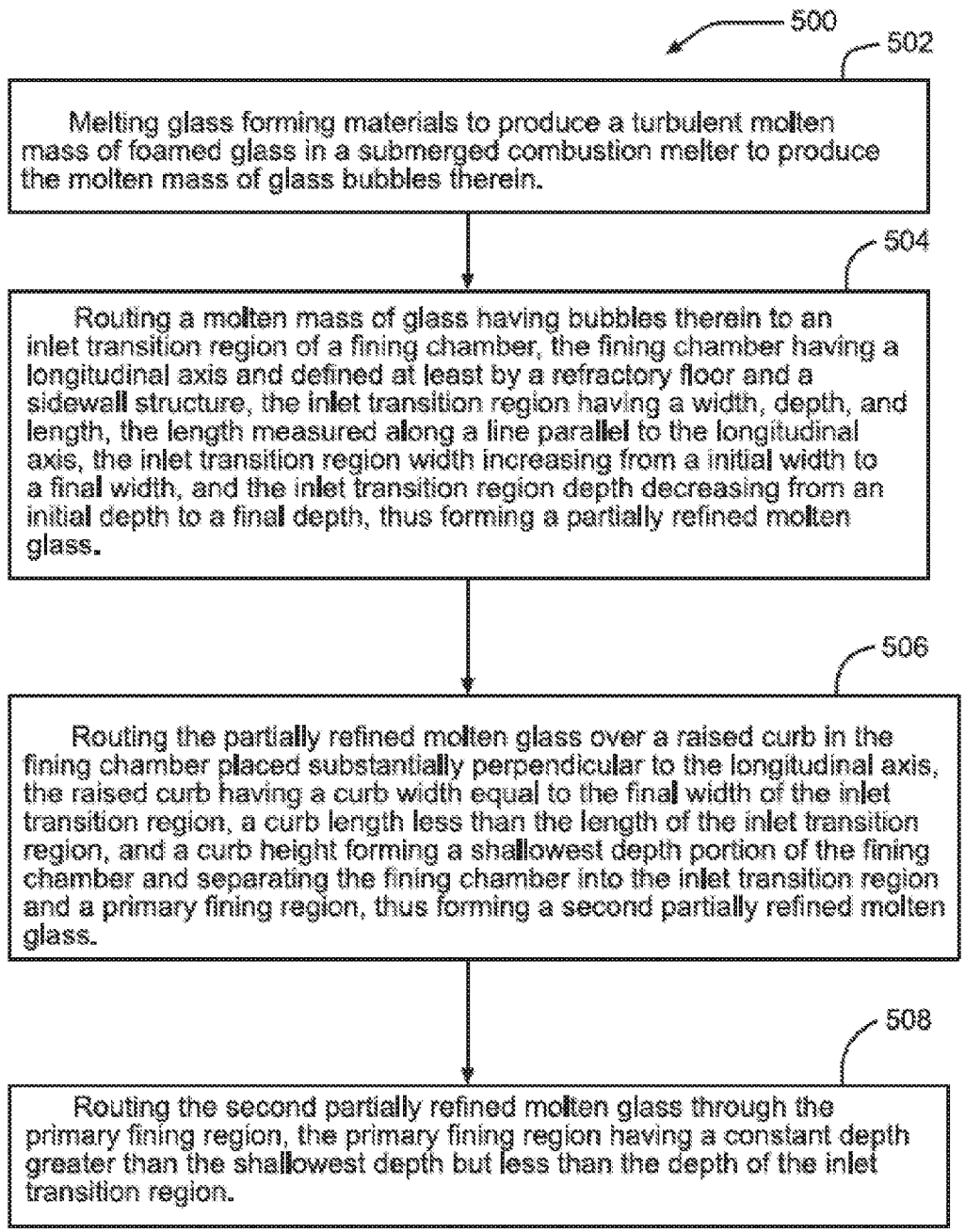

FIGS. 6 and 7 are logic diagrams of two non-limiting method embodiments in accordance with the present disclosure. FIG. 6 is a logic diagram of one method embodiment 400 of fining molten glass, while FIG. 7 is a logic diagram of one method embodiment 500 of making glass products. Method embodiment 400 includes routing a molten mass of glass having bubbles therein to an inlet transition region of a fining chamber, the fining chamber having a longitudinal axis and defined at least by a refractory floor and a sidewall structure, the inlet transition region having a width, depth, and length, the length measured along a line parallel to the longitudinal axis, the inlet transition region width increasing from an initial width to a final width, and the inlet transition region depth decreasing from an initial depth to a final depth, thus forming a partially refined molten glass, box 402; routing the partially refined molten glass over a raised curb in the fining chamber placed substantially perpendicular to the longitudinal axis, the raised curb having a curb width equal to the final width of the inlet transition region, a curb length less than the length of the inlet transition region, and a curb height forming a shallowest depth portion of the fining chamber and separating the fining chamber into the inlet transition region and a primary fining region, thus forming a second partially refined molten glass, box 404; and routing the second partially refined molten glass through the primary fining region, the primary fining region having a constant depth greater than the shallowest depth but less than the depth of the inlet transition region, box 406.

Method embodiment 500 (FIG. 7) includes melting glass-forming materials to produce a turbulent molten mass of foamed glass in a submerged combustion melter to produce the molten mass of glass having bubbles therein, box 502; routing a molten mass of glass having bubbles therein to an inlet transition region of a fining chamber, the fining chamber having a longitudinal axis and defined at least by a refractory floor and a sidewall structure, the inlet transition region having a width, depth, and length, the length measured along a line parallel to the longitudinal axis, the inlet transition region width increasing from an initial width to a final width, and the inlet transition region depth decreasing from an initial depth to a final depth, thus forming a partially refined molten glass, box 504; routing the partially refined molten glass over a raised curb in the fining chamber placed substantially perpendicular to the longitudinal axis, the raised curb having a curb width equal to the final width of the inlet transition region, a curb length less than the length of the inlet transition region, and a curb height forming a shallowest depth portion of the fining chamber and separating the fining chamber into the inlet transition region and a primary fining region, thus forming a second partially refined molten glass, box 506; and routing the second partially refined molten glass through the primary fining region, the primary fining region having a constant depth greater than the shallowest depth but less than the depth of the inlet transition region, box 508.

Precious metals for use herein for part or all of glass-contact refractory layer 56 may be platinum group metals or alloys thereof, such as platinum, rhodium, or platinum/rhodium alloy. Molybdenum and alloys thereof with other metals may also be used, as long as they meet temperature requirements. The thickness of a precious metal layer would not be more than necessary, but is technically limited only by the desired dimensions of the flow path of molten glass and footprint of the fining chamber. Precious metal may in some embodiments be 0.5 inch (1.25 cm) thick or more if cost were no impediment, but typically may range from about 0.02 to about 0.1 inch (about 0.05 cm to about 0.25 cm).

In certain embodiments, as will be understood, the shape of the roof or cover, floor, and sidewall structure of fining chambers described herein, as well as the location of the level or height of molten foamed or unfoamed glass, the amount of entrained bubbles, and amount of bubbles in foam layers, and sizes of primary fining region, ITR, and ETR may vary widely.

In certain embodiments employing one or more burners in ports 16 (FIG. 1), the burners may be air/fuel, oxy/fuel, or enriched oxygen/fuel burners combusting one or more fuels with one or more oxidants. Furthermore, in the SCM of certain system embodiments, SC burners create turbulence in molten foamed glass. The exits of SC burners may be flush with an SCM floor, or may protrude slightly into the SCM. SC burners may have one or more companion burners spaced transversely therefrom. SC burners may be placed randomly or non-randomly to protrude through the SCM floor and/or SCM sidewall structure. The SCM may receive numerous feeds through one or more inlet ports, and batch feeders maybe provided. Other feeds are possible, such as glass mat waste, wound roving, waste materials, and the like, such as disclosed in assignee's U.S. application Ser. No. 12/888,970, filed Sep. 23, 2010 (published as 20120077135 on Mar. 29, 2012), now Pat. No. 8,650,914, issued February 18, 2014. Oxidant, fuels, and other fluids may be supplied from one or more supply tanks or containers which are fluidly and mechanically connected to the SCM or fining chamber or transition regions via one or more conduits, which may or may not include flow control valves. One or more of the conduits may be flexible metal hoses, but they may also be solid metal, ceramic, or ceramic-lined metal conduits. Any or all of the conduits may include a flow control valve, which may be adjusted to shut off flow through a particular conduit. Those of skill in this art will readily understand the need for, and be able to construct suitable fuel supply conduits and oxidant supply conduits, as well as respective flow control valves, threaded fittings, quick connect/disconnect fittings, hose fittings, and the like.

Certain apparatus, systems and methods of the present disclosure may be combined with strategies for foam de-stabilization. For example, adding nitrogen as a treating composition to the molten mass of glass and bubbles in the ITR or the primary fining chamber may tend to make bubbles in an upper glass foam phase less stable when there is the presence of a high moisture atmosphere. A high moisture atmosphere may exist for example when one or more high momentum burners (whether oxy/fuel or not) are used as impingement burners in the ITR and/or primary fining chamber to impinge on upper glass foam phase. The use of one or more high momentum impingement burners (whether oxy/fuel or not) in a flow channel is described in assignee's co-pending application Ser. No. 13/493,170, filed Jun. 11, 2012, now Pat. No. 8,707,739, issued Apr. 29, 2014.

The flow rate of the molten glass through the ITR, primary fining chamber, and ETR will depend on many factors, including the geometry and size of the source (SCM, or other melter) feeding the fining chamber, temperature of the melt, viscosity of the melt, and like parameters, but in general the flow rate of molten glass containing bubbles may range from about 0.5 lb./min to about 5000 lbs./min or more (about 0.23 kg/min to about 2300 kg/min or more), or from about 10 lbs./min to about 500 lbs./min (from about 4.5 kg/min to about 227 kg/min), or from about 100 lbs./min to 300 lbs./min (from about 45 kg/min to about 136 kg/min).

As mentioned, certain embodiments may use high and/or low momentum burners for heat and/or foam de-stabilization in the ITR, and/or primary fining chamber, and/or ETR. For high momentum burners burning natural gas, the burners may have a fuel firing rate, per burner, ranging from about 10 to about 1000 scfh (from about 280 L/hr. to about 28,000 L/hr.); an oxygen firing rate ranging from about 15 to about 2500 scfh (from about 420 L/hr. to about 71,000 L/hr.); a combustion ratio ranging from about 1.5 to about 2.5; nozzle velocity ratio (ratio of velocity of fuel to oxygen at the fuel nozzle tip) ranging from about 0.5 to about 2.5; fuel gas velocity ranging from about 150 to about 1000 ft./sec (from about 46 m/sec to about 300 m/sec); and oxygen velocity ranging from about 150 to about 1000 ft./sec (from about 46 m/sec to about 300 m/sec). Of course these numbers depend on the heating value of the fuel, amount of oxygen in the "oxygen" stream, temperatures and pressures of the fuel and oxidant, and the like, among other parameters. In one typical operation, the high momentum burner would have a combustion ratio of 2.05:1; a velocity ratio of 1; firing rate of natural gas of 500 scfh (14,000 L/hr.) and 1075 scfh (30,400 L/hr.) oxygen; natural gas and oxygen velocities each of 270 ft./sec (80 m/sec); natural gas pressure of 1 psig (6.9 KPa); and oxygen pressure of 0.6 psig (4.1 KPa), pressures measured at the entrance to the combustion chamber.

Low momentum burners useful in apparatus, systems, and methods of this disclosure may include some of the features of those disclosed in assignee's U.S. patent application Ser. No. 13/268,130, filed Oct. 7, 2011, now Pat. No. 9,021,838, issued May 5, 2015.

For low momentum burners using natural gas as fuel, the burners may have a fuel firing rate, per burner, ranging from about 0.4 to about 500 scfh (from about 11 L/hr. to about 14,000 L/hr.); an oxygen firing rate ranging from about 0.6 to about 1000 scfh (from about 17 L/hr. to about 28,400 L/hr.); a combustion ratio ranging from about 1.5 to about 2.5; nozzle velocity ratio (ratio of velocity of fuel to oxygen at the fuel nozzle tip) ranging from about 0.5 to about 2.5; a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second).

Those of skill in this art will readily understand the need for, and be able to construct suitable fuel supply conduits and oxidant supply conduits, as well as respective flow control valves, threaded fittings, quick connect/disconnect fittings, hose fittings, and the like.

SCMs and other sources of molten glass containing bubbles may be fed a variety of feed materials. In SCMs processing glass batch, the initial raw material may include any material suitable for forming molten glass such as, for example, limestone, glass, sand, soda ash, feldspar and mixtures thereof. A glass composition for producing glass fibers known as "E-glass" typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in assignee's published U.S. applications 20070220922 and 20080276652. The initial raw material to provide these glass compositions can be calculated in known manner from the desired concentrations of glass components, molar masses of glass components, chemical formulas of batch components, and the molar masses of the batch components. Typical E-glass batches include those reproduced in Table 1, borrowed from US20070220922. Notice that during glass melting, carbon dioxide (from lime) and water (borax) evaporate. The initial raw material can be provided in any form such as, for example, relatively small particles.

TABLE 1

Typical E-glass batches

| Raw material | A Limestone (Baseline) | B Quicklime | C Ca Silicate | D Volcanic Glass | E Ca Silicate & Volcanic Glass | F Quartz-free #1 | G Quartz-free #2 | H Limestone/ Slag | I Ca-Silicate/ Slag | J Quartz-free #3 | K Quartz and Clay free | L Ca-Silicate/ Feldspar |
|---|---|---|---|---|---|---|---|---|---|---|---|---|
| Quartz (flint) | 31.3% | 35.9% | 15.2% | 22.6% | 8.5% | 0% | 0% | 22.3% | 5.7% | 0% | 0% | 19.9% |
| Kaolin Clay | 28.1% | 32.3% | 32.0% | 23.0% | 28.2% | 26.4% | 0% | 22.7% | 26.0% | 26.0% | 0% | 0% |
| BD Lime | 3.4% | 4.3% | 3.9% | 3.3% | 3.8% | 3.7% | 4.3% | 2.8% | 3.1% | 3.1% | 4.3% | 4.4% |
| Borax | 4.7% | 5.2% | 5.2% | 0% | 1.5% | 0% | 0% | 0% | 0% | 0% | 1.1% | 1.1% |
| Boric Acid | 3.2% | 3.9% | 3.6% | 7.3% | 6.9% | 8.2% | 8.6% | 7.3% | 8.2% | 8.2% | 7.7% | 7.8% |
| Salt Cake | 0.2% | 0.2% | 0.2% | 0.2% | 0.2% | 0.2% | 0.2% | 0.2% | 0.2% | 0.2% | 0.2% | 0.2% |
| Limestone | 29.1% | 0% | 0% | 28.7% | 0% | 0% | 0% | 27.9% | 0% | 0% | 0% | 0% |
| Quicklime | 0% | 18.3% | 0% | 0% | 0% | 0% | 0% | 0% | 0% | 0% | 0% | 0% |
| Calcium Silicate | 0% | 0% | 39.9% | 0% | 39.1% | 39.0% | 27.0% | 0% | 37.9% | 37.9% | 26.5% | 26.6% |
| Volcanic Glass | 0% | 0% | 0% | 14.9% | 11.8% | 17.0% | 4.2% | 14.7% | 16.8% | 16.8% | 0% | 0% |
| Diatomaceous Earth (DE) | | | | | | 5.5% | 17.4% | 0% | 0% | 5.7% | 20.0% | 0% |

TABLE 1-continued

Typical E-glass batches

| Raw material | A Limestone (Baseline) | B Quicklime | C Ca Silicate | D Volcanic Glass | E Ca Silicate & Volcanic Glass | F Quartz-free #1 | G Quartz-free #2 | H Limestone/ Slag | I Ca-Silicate/ Slag | J Quartz-free #3 | K Quartz and Clay free | L Ca-Silicate/ Feldspar |
|---|---|---|---|---|---|---|---|---|---|---|---|---|
| Plagioclase Feldspar | | | | | | 0% | 38.3% | 0% | 0% | 0% | 40.1% | 40.1% |
| Slag | | | | | | 0% | 0% | 2.0% | 2.0% | 2.0% | 0% | 0% |
| Total | 100% | 100% | 100% | 100% | 100% | 100% | 100% | 100% | 100% | 100% | 100% | 100% |
| Volume of $CO_2$ @ 1400 C. | 1668 | 0 | 0 | 1647 | 0 | 0 | 0 | 1624 | 0 | 0 | 0 | 0 |

SCMs may also be fed by one or more roll stands, which in turn supports one or more rolls of glass mat, as described in assignee's co-pending US application Ser. No. 12/888,970, filed Sep. 23, 2010, now Pat. No. 8,650,914, issued Feb. 18, 2014, incorporated herein by reference. In certain embodiments powered nip rolls may include cutting knives or other cutting components to cut or chop the mat (or roving, in those embodiments processing roving) into smaller length pieces prior to entering the SCM. Also provided in certain embodiments may be a glass batch feeder. Glass batch feeders are well-known in this art and require no further explanation.

The ITR, primary fining chamber, and ETR may include refractory fluid-cooled panels. Liquid-cooled panels may be used, having one or more conduits or tubing therein, supplied with liquid through one conduit, with another conduit discharging warmed liquid, routing heat transferred from inside the apparatus to the liquid away from the apparatus. Liquid-cooled panels may also include a thin refractory liner, which minimizes heat losses from the apparatus, but allows formation of a thin frozen glass shell to form on the surfaces and prevent any refractory wear and associated glass contamination. Other useful cooled panels include air-cooled panels, comprising a conduit that has a first, small diameter section, and a large diameter section. Warmed air transverses the conduits such that the conduit having the larger diameter accommodates expansion of the air as it is warmed. Air-cooled panels are described more fully in U.S. Pat. No. 6,244,197. In certain embodiments, the refractory fluid cooled-panels may be cooled by a heat transfer fluid selected from the group consisting of gaseous, liquid, or combinations of gaseous and liquid compositions that functions or is capable of being modified to function as a heat transfer fluid. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids that may be organic, inorganic, or some combination thereof, for example, salt solutions, glycol solutions, oils and the like. Other possible heat transfer fluids include steam (if cooler than the item to be cooled), carbon dioxide, or mixtures thereof with nitrogen. Heat transfer fluids may be compositions comprising both gas and liquid phases, such as the higher chlorofluorocarbons.

Glass-contact refractory lining 56 may or may not be necessary in all embodiments, but when present may have thickness ranging from just over 0 to about 2 inches (about 5 cm), or from just over 0 to about 1 inch (about 2.5 cm) when using water-cooled sidewalls, and may have thickness ranging from about 1 inch up to about 4 inches (from about 2.5 to about 10 cm), or from about 1 inch up to about 3 inches (from about 2.5 to about 7.5 cm) when using non-water-cooled sidewalls, however, greater thickness may entail more expense without resultant greater benefit, and thickness may be different depending on the composition of the refractory and when using cooling fluids other than water. The glass-contact refractory lining may be one or more layers. Glass-contact refractory used in Ping chambers described herein may be fused cast materials based on AZS (alumina-zirconia-silica), α/β alumina, zirconium oxide, chromium oxide, chrome corundum, so-called "dense chrome", and the like. One "dense chrome" material is available from Saint Gobain under the trade name SEFPRO, such as C1215 and C1221. Other useable "dense chrome" materials are available from the North American Refractories Co., Cleveland, Ohio (U.S.A.) under the trade designations SERV 50 and SERV 95. Other suitable materials for components that require resistance to high temperatures are fused zirconia ($ZrO_2$), fused cast AZS (alumina-zirconia-silica), rebonded AZS, or fused cast alumina ($Al_2O_3$). The choice of a particular material is dictated among other parameters by the geometry of the apparatus, the type of glass being produced, and the amount of foam and/or bubbles in or on the molten glass.

To ascertain the local and bulk distribution (size and/or location) of bubbles within the molten glass, and therefore the local and bulk glass density and/or glass foam density, methods and systems as described in assignee's co-pending application Ser. No. 13/752,672, filed Jan. 29, 2013, now Pat. No. 9,115,017, issued Aug. 25, 2015, may be employed, comprising an electromagnetic (EM) sensor comprising one or more EM sources and one or more EM detectors. When the terms "EM sensor" and "sensor" are used, they will be understood to mean a device having at least one EM source and at least one EM detector. In certain embodiments the EM source may be referred to as a nuclear source. The electromagnetism may be referred to as radiation, and may be in wave, particle and wave/particle formats. The EM source or sources and EM detector or detectors may provide feedback on the density gradient of the molten glass in a vessel. Based on the path the EM wave must travel, the glass density gradient within the path, the amount of radiation detected by the EM detector is a function of both the glass level as well as the range of densities of the molten foamed glass in the path of the radiation. If both the EM source and the EM detector are stationary, then measuring the glass level can provide an indication regarding how much of a change in detection could be due to a change in effective glass level, and how much is due to a change in glass density. Cobalt-60 and caesium-137 are the most suitable gamma radiation sources for radiation processing because of the relatively high energy of their gamma rays and fairly long half-life (5.27 years for cobalt-60 and 30.1 years for caesium-137). If used, the EM source may be sized appropriately depending upon the expected attenuation between the EM source and the EM detector due to distance, vessel wall thickness, vessel wall density, width of the molten foamed glass pool or stream being analyzed, molten foamed glass density, and EM detector size being utilized. Provided this information, a vendor supplying the EM source and EM detector should be able to size the EM source appropriately without undue experimentation.

Those having ordinary skill in this art will appreciate that there are many possible variations of the systems and methods described herein, and will be able to devise alternatives and improvements to those described herein that are nevertheless considered to be within the claims. For example, raised curb 40 may exist as a series of several raised curbs of different heights; for example higher in the middle and lower toward sidewalls. Another alternative may be for the raised curb to be angled to the longitudinal axis of the fining chamber. In other embodiments, the raised curb may be in a single V-pattern, with the apex pointing upstream. Other variations will no doubt occur to those skilled in the art.

What is claimed is:

1. A method comprising:
routing a molten mass of glass having bubbles therein to an inlet transition region of a fining chamber, the fining chamber having a longitudinal axis and defined at least by a refractory floor and first and second sidewalls, the inlet transition region having a width, depth, and length, the length measured along a line parallel to the longitudinal axis, the inlet transition region width increasing from an initial width to a final width, and the inlet transition region depth defined by a planar floor that slants upward in the flow direction at an angle to horizontal, thus forming a partially refined molten glass;
routing the partially refined molten glass over a raised curb in the fining chamber placed substantially perpendicular to the longitudinal axis, the raised curb having a curb width equal to the final width of the inlet transition region, a curb length less than the length of the inlet transition region, and a curb height forming a shallowest depth portion of the fining chamber, the curb height being greatest at the longitudinal axis and decreasing gradually to one half of the curb height at the longitudinal axis at the first and second sidewalls, and separating the fining chamber into the inlet transition region and a primary fining region, thus forming a second partially refined molten glass,
the raised curb forcing portions of the second partially refined molten glass to flow toward the first and second sidewalls of the primary fining region as it enters the primary fining region, the primary fining region having a constant depth greater than the shallowest depth but less than the depth of the inlet transition region.

2. The method of claim 1 further comprising melting glass-forming materials to produce a turbulent molten mass of foamed glass in a submerged combustion melter to produce the molten mass of glass having bubbles therein.

3. The method of claim 1 further comprising separating the second partially refined molten glass into an upper phase consisting essentially of glass foam and a lower phase consisting essentially of molten glass as the second partially refined molten glass flows toward an exit transition region of the fining chamber, the exit transition region having a width, a length, and a depth, wherein the width decreases from an initial width equal to the width of the primary fining region to a final width that is less than the initial width by a factor of 0.5 or less.

4. The method of claim 3 further comprising routing the molten glass through and out of at least one passage in the exit transition region that is positioned lower than a phase boundary between the upper and lower phases in the exit transition region.

5. The method of claim 4 comprising temperature homogenizing the molten glass as it passes through at least one of the inlet transition region, the primary fining region, and the exit transition region.

6. The method of claim 5 comprising feeding at least a portion of the temperature homogenized molten glass to one or more glass forming stations.

7. The method of claim 6 comprising wherein the glass forming stations are selected from the group consisting of fiber forming spinnerets, fiberization stations, and non-glass fiber product forming stations.

8. The method of claim 4 comprising controllably flowing at least some of the molten glass by gravity through at least one aperture in the floor of the exit transition region upon a planned or unplanned condition.

9. The method of claim 4 comprising cooling the sidewall structure using fluid-cooling of the sidewall structure sufficient to form a frozen glass layer on inside surfaces of the sidewall structure.

10. The method of claim 4 comprising cooling the molten glass as it passes through the at least one passage to a temperature just above a desired glass product forming temperature.

11. The method of claim 1 wherein the step of routing the molten mass of glass having bubbles therein to the inlet transition region of the fining chamber comprises flowing the molten mass of glass through at least one inlet aperture of the inlet transition region, wherein 100 percent of the inlet aperture is lower than a level of molten glass in the inlet transition region.

12. A method comprising:
routing a molten mass of glass having bubbles therein to an inlet transition region of a fining chamber, the fining chamber having a longitudinal axis and defined at least by a refractory floor and first and second sidewalls, the inlet transition region having a width, depth, and length, the length measured along a line parallel to the longitudinal axis, the inlet transition region width increasing from an initial width to a final width, and the inlet transition region depth defined by a floor comprising a non-planar, arcuate section that curves upward in a flow direction connected to a planar horizontal step, resulting in different depths of molten glass therein, thus forming a partially refined molten glass;
routing the partially refined molten glass over a raised curb connected to the planar horizontal step in the fining chamber, the raised curb placed substantially perpendicular to the longitudinal axis, the raised curb having a curb width equal to the final width of the inlet transition region, a curb length less than the length of the inlet transition region, and a curb height forming a shallowest depth portion of the fining chamber, the curb height being greatest at the longitudinal axis and decreasing gradually to one half of the curb height at the longitudinal axis at the first and second sidewalls, and separating the fining chamber into the inlet transition region and a primary fining region, thus forming a second partially refined molten glass, the raised curb forcing portions of the second partially refined molten glass to flow toward the first and second sidewalls of the primary fining region as it enters the primary fining region, the primary fining region having a constant depth greater than the shallowest depth but less than the depth of the inlet transition region.

13. The method of claim 12 further comprising melting glass-forming materials to produce a turbulent molten mass of foamed glass in a submerged combustion melter to produce the molten mass of glass having bubbles therein.

14. The method of claim 12 further comprising separating the second partially refined molten glass into an upper phase consisting essentially of glass foam and a lower phase consisting essentially of molten glass as the second partially refined molten glass flows toward an exit transition region of the fining chamber, the exit transition region having a width, a length, and a depth, wherein the width decreases from an initial width equal to the width of the primary fining region to a final width that is less than the initial width by a factor of 0.5 or less.

15. The method of claim 14 further comprising routing the molten glass through and out of at least one passage in the exit transition region that is positioned lower than a phase boundary between the upper and lower phases in the exit transition region.

16. The method of claim 15 comprising temperature homogenizing the molten glass as it passes through at least one of the inlet transition region, the primary fining region, and the exit transition region.

17. The method of claim 16 comprising feeding at least a portion of the temperature homogenized molten glass to one or more glass forming stations.

18. The method of claim 17 comprising wherein the glass forming stations are selected from the group consisting of fiber forming spinnerets, fiberization stations, and non-glass fiber product forming stations.

19. The method of claim 12 wherein the step of routing the molten mass of glass having bubbles therein to the inlet transition region of the fining chamber comprises flowing the molten mass of glass through at least one inlet aperture of the inlet transition region, wherein 100 percent of the inlet aperture is lower than a level of molten glass in the inlet transition region.

20. The method of claim 15 comprising controllably flowing at least some of the molten glass by gravity through at least one aperture in the floor of the exit transition region upon a planned or unplanned condition.

21. The method of claim 15 comprising cooling the sidewall structure using fluid-cooling of the sidewall structure sufficient to form a frozen glass layer on inside surfaces of the sidewall structure.

22. The method of claim 15 comprising cooling the molten glass as it passes through the at least one passage to a temperature just above a desired glass product forming temperature.

23. A method comprising:
routing a molten mass of glass having bubbles therein to an inlet transition region of a fining chamber, the fining chamber having a longitudinal axis and defined at least by a refractory floor and first and second sidewalls, the inlet transition region having a width, depth, and length, the length measured along a line parallel to the longitudinal axis, the inlet transition region width increasing from an initial width to a final width, and the inlet transition region depth defined by a non-planar, arcuate floor that curves upward in a flow direction, resulting in different depths of molten glass therein, thus forming a partially refined molten glass;
routing the partially refined molten glass over a raised curb connected to the non-planar, arcuate floor that curves upward in a flow direction in the fining chamber, the raised curb placed substantially perpendicular to the longitudinal axis, the raised curb having a curb width equal to the final width of the inlet transition region, a curb length less than the length of the inlet transition region, and a curb height forming a shallowest depth portion of the fining chamber, the curb height being greatest at the longitudinal axis and decreasing gradually to one half of the curb height at the longitudinal axis at the first and second sidewalls, and separating the fining chamber into the inlet transition region and a primary fining region, thus forming a second partially refined molten glass, the raised curb forcing portions of the second partially refined molten glass to flow toward the first and second sidewalls of the primary fining region as it enters the primary fining region, the primary fining region having a constant depth greater than the shallowest depth but less than the depth of the inlet transition region.

24. The method of claim 23 further comprising melting glass-forming materials to produce a turbulent molten mass of foamed glass in a submerged combustion melter to produce the molten mass of glass having bubbles therein.

25. The method of claim 23 further comprising separating the second partially refined molten glass into an upper phase consisting essentially of glass foam and a lower phase consisting essentially of molten glass as the second partially refined molten glass flows toward an exit transition region of the fining chamber, the exit transition region having a width, a length, and a depth, wherein the width decreases from an initial width equal to the width of the primary fining region to a final width that is less than the initial width by a factor of 0.5 or less.

26. The method of claim 25 further comprising routing the molten glass through and out of at least one passage in the exit transition region that is positioned lower than a phase boundary between the upper and lower phases in the exit transition region.

27. The method of claim 26 comprising temperature homogenizing the molten glass as it passes through at least one of the inlet transition region, the primary fining region, and the exit transition region.

28. The method of claim 27 comprising feeding at least a portion of the temperature homogenized molten glass to one or more glass forming stations.

29. The method of claim 28 comprising wherein the glass forming stations are selected from the group consisting of fiber forming spinnerets, fiberization stations, and non-glass fiber product forming stations.

30. The method of claim 26 comprising controllably flowing at least some of the molten glass by gravity through at least one aperture in the floor of the exit transition region upon a planned or unplanned condition.

31. The method of claim 26 comprising cooling the sidewall structure using fluid-cooling of the sidewall structure sufficient to form a frozen glass layer on inside surfaces of the sidewall structure.

32. The method of claim 26 comprising cooling the molten glass as it passes through the at least one passage to a temperature just above a desired glass product forming temperature.

33. The method of claim 23 wherein the step of routing the molten mass of glass having bubbles therein to the inlet transition region of the fining chamber comprises flowing the molten mass of glass through at least one inlet aperture of the inlet transition region, wherein 100 percent of the inlet aperture is lower than a level of molten glass in the inlet transition region.

* * * * *